United States Patent
Shen

(10) Patent No.: US 10,288,921 B2
(45) Date of Patent: May 14, 2019

(54) RUBBER FRAME, BACKLIGHT, DISPLAY DEVICE AND ASSEMBLING METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Qiyu Shen, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 3 days.

(21) Appl. No.: 15/324,950

(22) PCT Filed: Feb. 5, 2016

(86) PCT No.: PCT/CN2016/073686
§ 371 (c)(1),
(2) Date: Jan. 9, 2017

(87) PCT Pub. No.: WO2017/045349
PCT Pub. Date: Mar. 23, 2017

(65) Prior Publication Data
US 2017/0293167 A1    Oct. 12, 2017

(30) Foreign Application Priority Data
Sep. 17, 2015   (CN) .......................... 2015 1 0596085

(51) Int. Cl.
*G02F 1/1333*    (2006.01)

(52) U.S. Cl.
CPC ...... *G02F 1/133308* (2013.01); *G02F 1/1333* (2013.01); *G02F 2001/133317* (2013.01);
(Continued)

(58) Field of Classification Search
CPC ... G02F 2001/133317; G02F 1/133308; G02F 1/1333; G02F 2001/133322; G02F 2001/503; G02F 2001/133325
See application file for complete search history.

(56) References Cited

U.S. PATENT DOCUMENTS

2002/0131141 A1*  9/2002  Saitoh ............... G02F 1/133308
                                                      359/245
2007/0064378 A1    3/2007  Lo et al.
(Continued)

FOREIGN PATENT DOCUMENTS

CN        1580888 A      2/2005
CN      201237685 Y      5/2009
(Continued)

OTHER PUBLICATIONS

First Chinese Office Action, for Chinese Patent Application No. 201510596085.9, dated Jul. 31, 2017, 14 pages.
(Continued)

*Primary Examiner* — Jessica M Merlin
(74) *Attorney, Agent, or Firm* — Kinney & Lange, P.A.

(57) ABSTRACT

A rubber frame, a backlight, a display device and assembling method thereof are disclosed. Embodiments of the present disclosure relate to the field of display technology, can prevent the liquid crystal panel and the backlight from being loosen or separated from each other and can eliminate or at least reduce display faults caused thereby. The rubber frame of the disclosure is suitable for liquid crystal display devices, and a side wall of the rubber frame is provided a slot for receiving a liquid crystal cell. The slot is formed as a
(Continued)

half-closed structure having three enclosing side walls and only one open side. The rubber frame and the display device of the present disclosure include the rubber frame.

15 Claims, 2 Drawing Sheets

(52) U.S. Cl.
CPC ............ *G02F 2001/133322* (2013.01); *G02F 2001/133325* (2013.01); *G02F 2201/503* (2013.01)

(56) References Cited

U.S. PATENT DOCUMENTS

| | | | | |
|---|---|---|---|---|
| 2007/0252922 | A1* | 11/2007 | Oohira | G02F 1/133308 349/58 |
| 2010/0328571 | A1* | 12/2010 | Itaya | G02F 1/133308 349/58 |
| 2010/0328854 | A1* | 12/2010 | Nakao | G02F 1/133308 361/679.01 |
| 2013/0003339 | A1* | 1/2013 | Chen | A47B 81/06 361/807 |
| 2013/0141665 | A1* | 6/2013 | Huang | G02F 1/133308 349/60 |

FOREIGN PATENT DOCUMENTS

| | | |
|---|---|---|
| CN | 102495498 A | 6/2012 |
| CN | 202631898 U | 12/2012 |
| CN | 102998846 A | 3/2013 |
| CN | 103133934 A | 6/2013 |
| CN | 204100058 U | 1/2015 |
| CN | 204513082 U | 7/2015 |
| CN | 105093635 A | 11/2015 |
| KR | 101292148 B1 | 8/2013 |

OTHER PUBLICATIONS

International Search Report and Written Opinion (including English translation of Box V.) dated Jun. 16, 2016, for corresponding PCT Application No. PCT/CN2016/073686.

* cited by examiner

RUBBER FRAME, BACKLIGHT, DISPLAY DEVICE AND ASSEMBLING METHOD THEREOF

CROSS-REFERENCE TO RELATED APPLICATION

The present application is a Section 371 National Stage Application of International Application No. PCT/CN2016/073686, filed 5 Feb. 2016, entitled "RUBBER FRAME, BACKLIGHT, DISPLAY DEVICE AND ASSEMBLING METHOD THEREOF", which claims priority to Chinese patent application Serial No. 201510596085.9 filed on Sep. 17, 2015, incorporated herein in its entirety by reference.

TECHNICAL FIELD

Embodiments of the present disclosure relate to the field of display technology, and especially to a rubber frame, a backlight, a display device and an assembling method thereof.

BACKGROUND

Touch-LCMs (Touch and Liquid Crystal display Modules) having a display function and a touch function have occupied a considerable share in the market of displays currently. When a Touch-LCM module is to be assembled, a cover plate 101 is first adhered to an Open CELL through OCA (Optical Clear Adhesive) 102, and a backlight is assembled after the cover plate has been adhered, and a specific structure is shown in FIG. 1, where the Open Cell is a semi-finished product of a liquid crystal panel, and usually refers to a liquid crystal cell on which an upper polarizer 103, a lower polarizer 106, an IC (Integrated Circuit) chip, a FPC (Flexible Printed Circuit), a PCBA (Printed Circuit Board+Assembly) and the like have already been adhered. The liquid crystal cell is assembled from a color filter substrate 104 and an array substrate 105 that are disposed opposite to and adhered to each other with liquid crystals filled therebetween; a backlight includes an optical film 108, a rubber frame 107, a light guide plate 109, a reflecting sheet 110, a backplate 111 and the like. An ordinary skilled in the art would find that a conventional Touch-LCM (FIG. 1) assembled through the above method has a problem that the liquid crystal panel may easily separate from the backlight or components of the module may break off when the module is subjected to high and low temperature impacts, or an abnormal picture display due to shrink of the films, or other functional faults.

SUMMARY

In order to at least partially overcome or alleviate the above mentioned defects and/or disadvantages, embodiments of the present disclosure have provided a rubber frame, a backlight, a display device and a assembling method thereof, which may effectively prevent the liquid crystal panel and the backlight from being relatively loosened and separated from each other, and reduce disadvantageous caused thereby.

In order to achieve the above object, following technical solutions are provided in embodiments of the invention.

According to an embodiment of the disclosure, there is provided a rubber frame suitable for a liquid crystal display device. A side wall of the rubber frame is provided with a slot configured to receive a liquid crystal cell inserted therein, and the slot is formed as a half-closed structure having three enclosing side walls and only one open side.

Optionally, one enclosing side wall of the slot which is not opposite to the open side extends outwards to form a stepped surface on which the liquid crystal cell is seated.

According to an embodiment of the disclosure, a bottom surface of the slot opposite to the open side is configured to be inclined with respect to the stepped surface.

According to an embodiment of the disclosure, an angle formed between the bottom surface and a normal line of the stepped surface is greater than or equal to 3 degrees and less than or equal to 5 degrees.

According to an embodiment of the disclosure, an upper side wall of the slot located adjacent to the open side and in parallel with and opposite to the stepped surface forms an outward extending portion at an upper end of the rubber frame to restrict the liquid crystal cell inserted within the slot from above.

According to an embodiment of the disclosure, a width of the slot is configured to match with a thickness of the liquid crystal cell.

Optionally, a depth of the slot at a deepest location thereof ranges from 0.1 mm to 0.3 mm.

Optionally, a distance between the upper side wall of the slot and a top end of the rubber frame ranges from 0.1 mm to 0.2 mm.

According to an embodiment of the disclosure, there is provided a backlight, which includes the rubber frame according to any one of the above embodiments.

According to an embodiment of the disclosure, there is further provided a display device, which includes the rubber frame according to any one of the above embodiments or the backlight mentioned above.

According to an embodiment of the disclosure, the display device further includes a first double-faced adhesive tape disposed between a side surface of the liquid crystal cell and the bottom surface of the slot for adhering the liquid crystal cell and the rubber frame together.

According to an embodiment of the disclosure, the display device further includes a second double-faced adhesive tape disposed on a top end of the rubber frame for adhering a cover plate and the rubber frame together.

In another aspect, according to an embodiment of the disclosure, there is provided an method for assembling a display device, the method including: adhering the cover plate and the liquid crystal cell together via clear optical adhesive; and assembling the liquid crystal cell to which the cover plate is adhered and the backlight above together, where an end of the liquid crystal cell is disposed within the slot in the side wall of the rubber frame.

According to an embodiment of the disclosure, the step of assembling the liquid crystal cell to which the cover plate is adhered and the backlight includes: arranging a first double-faced adhesive tape within the slot in the side wall of the rubber frame of the backlight, and arranging a second double-faced adhesive tape at a top end of the rubber frame; and assembling the liquid crystal cell to which the cover plate is adhered with the backlight, the cover plate being adhered with the top end of the rubber frame via the second double-faced adhesive tape, and an end of the liquid crystal cell being adhered within the slot via the first double-faced adhesive tape during inserting the end of the liquid crystal cell into the slot.

A rubber frame, a backlight, a display device and assembling method thereof are disclosed. Through providing a slot in a side wall of the rubber frame and inserting an end of a liquid crystal cell into the slot, disclosed technical solutions can effectively prevent the liquid crystal panel and the backlight from being loosen or separated from each other and reduce display faults caused thereby.

BRIEF DESCRIPTION OF THE DRAWINGS

In order to more clearly introduce technical solutions provided in embodiments of the invention, the appended drawings that are used to illustrate the embodiments will be briefly introduced. Apparently, these appended drawings only illustrate some embodiments of the invention, and drawings of other embodiments can be obtained by a person of ordinary skill without a creative work based on the appended drawings.

LIST OF REFERENCE NUMERALS

Figure 1:
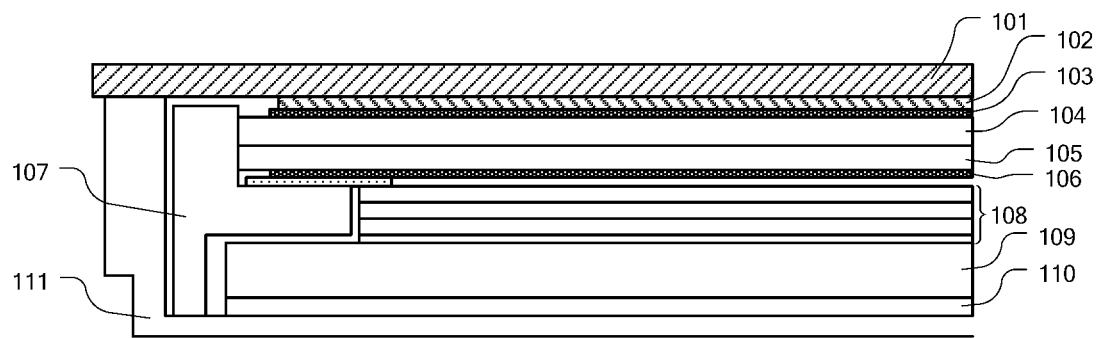
FIG. 1 is a schematic drawing showing a cross section of a prior art display device.

101: cover plate
102: clear optical adhesive
103: upper polarizer
104: color filter substrate
105: array substrate,
106: lower polarizer
107: rubber frame according to prior art
108: optical film
109: light guide plate
110: reflecting sheet
111: backplate
107': rubber frame according to an embodiment of the invention
200: slot
201: stepped surface
202: bottom surface
203: outward extended portion
301: first double-faced adhesive tape
302: second double-faced adhesive tape

DETAILED DESCRIPTION OF PREFERRED EMBODIMENTS

Embodiments of the present disclosure have provided a rubber frame, a backlight, a display device and an assembling method thereof, which may effectively prevent the liquid crystal panel and the backlight from being relatively loosened and separated from each other, and at least partially reduce or eliminate faults caused thereby.

Technical solutions in embodiments of the present disclosure will be described clearly and fully in conjunction with the appended drawings. Same or similar reference numerals indicate same or similar parts throughout the specification. The description hereinafter is intended to introduce a general inventive concept of the embodiments of the invention, and should not be interpreted as a limitation to the scope of the invention.

Further, lots of specific details are set forth in the following description to fully disclose the present disclosure such that it can be comprehensively understood. Apparently, one or more embodiments may be implemented without one or more of the specific details. Well-known structures and means are schematically illustrated to simplify the drawings.

Figure 2:
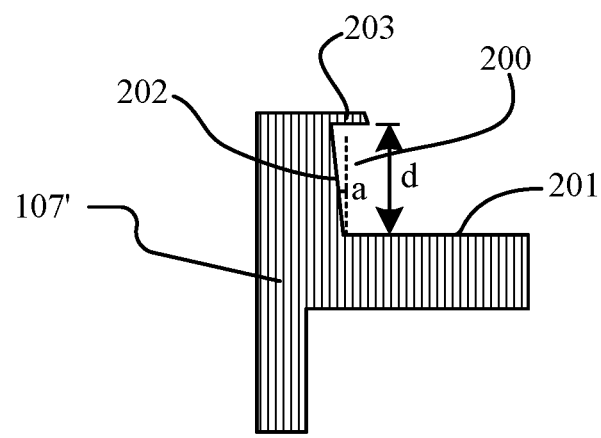
FIG. 2 is a schematic drawing showing a cross section of a rubber frame according to an embodiment of the invention.

According to a general inventive concept of the invention, an embodiment of the present disclosure provides a rubber frame suitable for a liquid crystal display device. As shown in FIG. 2, a sidewall of a rubber frame 107' is provided with a slot 200 for receiving a liquid crystal cell. The slot 200 is formed as a half-closed structure having three enclosing side walls and an open side. When a backlight is to be assembled with the liquid crystal cell, an end of the liquid crystal cell is inserted into the slot 200 from the open side, so as to effectively prevent the liquid crystal panel and the backlight from being relatively loosened and separated from each other, and at least partially reduce or eliminate faults caused thereby.

As shown in FIG. 2, a structure of the rubber frame according to the embodiment is shown. A sidewall of the rubber frame 107' is provided with a slot 200, which is defined by three enclosing side walls and has only one open side. One side wall of the slot 200, which is located adjacent to the open side and which is not an opposite side to the open side, extends outwards and forms an stepped surface 201 on which the liquid crystal cell may be seated; a bottom surface 202 of the slot 200 opposite to the open side of the slot 200 is configured to be inclined with respect to the stepped surface 201. The term "inclined" means that the bottom surface 202 of the slot 200 form an angle "a" with a normal line (as shown by the dashed line in FIG. 2) of the stepped surface 201 and the angle has a nonzero degree. An upper side wall of the slot 200, which is located adjacent to the open side of the slot 200 and in parallel with and opposite to the stepped surface 201, forms an outward extending portion 203 at an upper end of the rubber frame 107' to restrict the liquid crystal cell inserted into the slot 200 from above.

In the embodiment, the liquid crystal cell is disposed on the stepped surface 201 of the rubber frame 107' with one end thereof being inserted within the slot 200. Since the bottom surface 202 of the slot 200 is an inclined surface relative to the stepped surface 201, a depth of the slot 200 gradually become larger from the bottom to the top, as shown in FIG. 2. In such a manner, even if a length or thickness of the liquid crystal cell has a certain process deviation (for example, a thickness of the liquid crystal cell is slightly smaller than a width of the slot 200), the liquid crystal cell still can be inserted into and securely fixed in the slot 200, Moreover, when the liquid crystal cell is heated and expanded, the liquid crystal cell will be pushed upward from the stepped surface 201 and moved toward the outward extending portion 203 under an extruding force applied by the inclined bottom surface 202, but it will be finally restricted by the outward extending portion 203 of the slot 200 and be prevented from going out of the slot 200; when the liquid crystal cell is cooled and shrinks, the liquid crystal cell will move downward from the outward extending portion 203 to a position in the slot 200 that is nearer to the stepped surface. The liquid crystal cell can not only be sufficiently fixed, but also can automatically self-adjusted within the slot 200 when subjected to a heat or cold impact, so as to prevent the liquid crystal cell from being loosened in the slot 200. In other words, the slot 200 has a fixing function and a location adjusting function. According to the embodiment of the invention, when the angle formed between the bottom surface 202 and the normal line of the stepped surface 201 is greater than or equal to 3 degrees and less than or equal to 5 degrees (i.e., $3° \leq a \leq 5°$), the effect of the location adjusting function preventing the liquid crystal cell from being loosened would be optimal.

Figure 3:
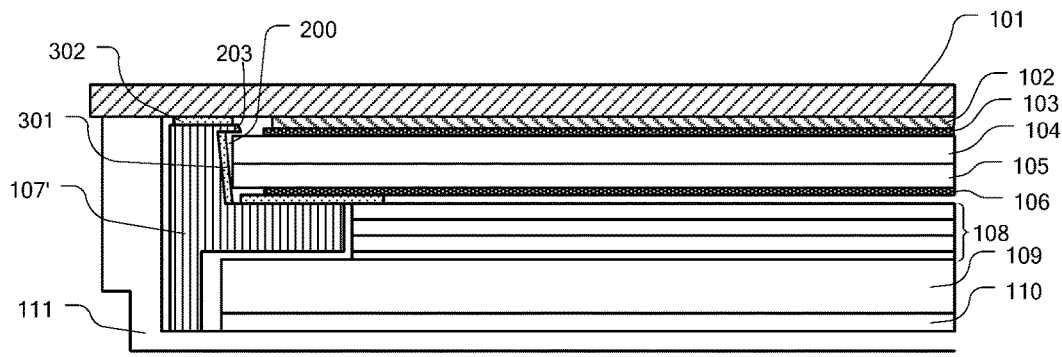
FIG. 3 is a schematic drawing showing a cross section of a display device according to an embodiment of the invention.

According to an embodiment of the invention, the width of the slot 200 matches with the thickness of the liquid crystal cell. As shown in FIG. 3, if a polarizer (103, 106) is arranged on the liquid crystal cell (i.e., a cell formed by assembling the color filter substrate 104 and the opposite array substrate 105 and filling a space therebetween with liquid crystals), the width d of the slot 200, i.e., the distance between the stepped surface 201 and a lower surface of the outward extending portion 203 being parallel to each other, should be equal to the thickness of the liquid crystal cell plus a thickness of the lower polarizer 106. Since the upper polarizer 103 shown in FIG. 3 is not inserted into the slot 200, a thickness of the upper polarizer 103 is out of consideration when the width d of the slot 200 is calculated.

A backlight is further provided in an embodiment of the invention, which includes the rubber frame according to any one of the embodiments discussed above, and which may also solve the technical problem that the backlight may easily be loosened and separated from the liquid crystal cell, and reduce or eliminate faults caused the problems. Besides of the liquid crystal TV sets and the liquid crystal display, the backlight may also be used in digital frames, electronic papers, cell phones and other display devices that need a backlight. The rubber frame and the backlight according to the embodiment of the present disclosure are suitable to be assembled with a Touch-LCM module or a display module, but not limited thereto.

A display device is further provided according to an embodiment of the invention, which includes the rubber frame according to any one of the embodiments that have been discussed above, or includes a backlight including the above rubber frame. Since the display device utilizes the backlight or the rubber frame according to the above embodiments of the present disclosure and for similar reasons, the display device has a stable structure, which may prevent the liquid crystal panel and the backlight from being relatively loosened and separated from each other and display faults caused thereby. The display device may be a liquid crystal panel, an electronic paper, a cell phone, a tablet computer, a TV set, a display, a notebook computer, a digital frame, a navigator or another product or part that has a display function.

As an example, please refer to FIG. 3, the display device may also include a first double-faced adhesive tape 301 and a second double-faced adhesive tape 302. The first double-faced adhesive tape 301 is disposed between an end face of the liquid crystal cell and the bottom surface 202 of the slot 200 opposite to the open side, for adhering the end of the liquid crystal cell to a side portion of the rubber frame 107'; the second double-faced adhesive tape 302 is disposed on a top end of the rubber frame 107', for adhering a bottom end of the cover plate 101 and a top surface of the outward extending portion 203 at the top end of the rubber frame 107' together. The first double-faced adhesive tape 301 and the second double-faced adhesive tape 302 may, for example, further increase bonding intensity between components such as the liquid crystal cell, the rubber frame, the cover plate and the like, effectively prevent the liquid crystal panel and the backlight from being relatively loosened and separated from each other, and eliminate faults such as abnormal picture display caused by departure of modules or parts or film shrink due to high and low temperature impact and high humidity environment.

Figure 4:
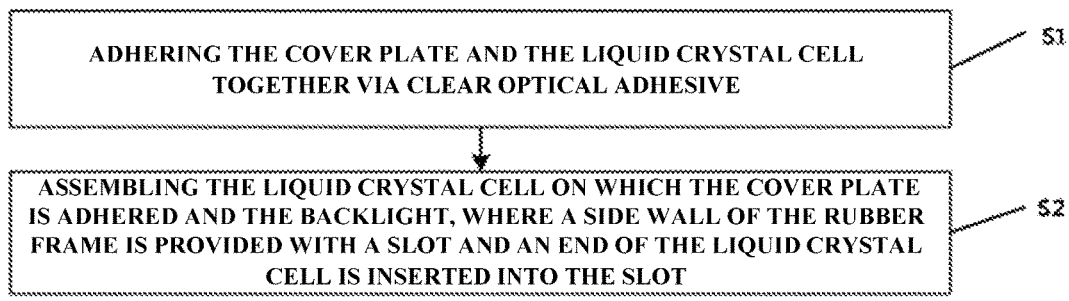
FIG. 4 is a flow chart showing a method of assembling a display device according to an embodiment of the invention.

As another aspect of the invention, in an alternative embodiment, a method for assembling the display device is provided. As shown in FIG. 4, the method includes:

step S1: adhering the cover plate 101 and the liquid crystal cell together via clear optical adhesive 102, where the clear optical adhesive 102 may be, for example, optical clear resin (OCR) adhesive or optically clear adhesive (OCA), and where OCR is a solid adhesive and OCA is a liquid glue; and step S2: assembling the liquid crystal cell on which the cover plate 101 is adhered and the backlight according to the embodiment discussed above, where an end of the liquid crystal cell is inserted into and fixed within the slot 200 in the side wall of the rubber frame 107'.

In an embodiment of the invention, the step of assembling the liquid crystal cell on which the cover plate is adhered and the backlight includes: arranging the first double-faced adhesive tape 301 within the slot 200 in the side wall of the rubber frame 107' of the backlight, and arranging the second double-faced adhesive tape 302 at the top end of the rubber frame 107'; then assembling the liquid crystal cell on which the cover plate 101 is adhered with the backlight, such that the cover plate 101 are adhered with the top end of the rubber frame 107' via the second double-faced adhesive tape 302; and adhering the end of the liquid crystal cell within the slot 200 via the first double-faced adhesive tape 301 during inserting the end of the liquid crystal cell into the slot 200.

In the assembling method according to the embodiment of the invention, first, the cover plate is adhered with the Open CELL, then the backlight is assembled; the rubber frame for the backlight is provided with a slot, and double-faced adhesive tapes are arranged inside the slot and at the top end of the rubber frame for adhering; when a cover plate adhered with an Open CELL is to be assembled with the backlight, a color filter (CF) substrate and a thin film transistor (TFT) substrate are inserted into the slot by an operating device and fixed to the rubber frame; meanwhile, the double-faced adhesive tape at the top end of the rubber frame forms a seal with the cover plate. Such a design may provide a good fit between the backlight and the cover plate and prevent moisture from entering the backlight, prevent the backlight and the cover plate from being easily separated apart, and prevent relatively loosing caused by departure of modules or parts or film shrink due to high and low temperature impact and high humidity environment and faults such as abnormal picture display caused thereby.

In order that those ordinary skilled in the art can better understand the structures of the display device and the backlight provided in the embodiments of the invention, the concept of the present disclosure will be described in conjunction with a specific embodiment as follows.

A cross section of a display device according to an embodiment of the present disclosure is shown in FIG. 3: a cover plate 101 (i.e., a cover glass, or a protective plate for touch screen) is adhered to an Open CELL (i.e., a liquid crystal cell with a polarizer, an IC, a FPC, a PCBA and the like adhered thereon) via clear optical adhesive 102; then the Open CELL adhered with the cover plate 101 is assembled with the backlight. The Open CELL includes a color filter substrate 104, an array substrate 105, an IC, a FPC, a TFPC (Touch Flexible Printed Circuit) and the like that are adhered to the array substrate 105, and lower diffusers; The backlight includes optical films 10 such as a prism sheet set, a light guide plate 109, a reflecting sheet 110, a rubber frame 107', a first double-faced adhesive tape 301, a second double-faced adhesive tape 302 and a backplate 111.

As shown in FIG. 2, the rubber frame 107' according to the embodiment of the present disclosure is designed as having a slot 200, and a cross section of the slot 200 is in a shape of an inverted triangle. The first double-faced adhesive tape 301 is adhered inside the slot 200, the second double-faced adhesive tape 302 is adhere on the top of the rubber frame 107'. The first double-faced adhesive tape 301 inside the slot 200 is automatically adhered to an Open CELL as the Open CELL is being inserted into the rubber frame 107'. The outward extending portion 203 is formed at the top end of the rubber frame 107' to clamp the Open CELL inside the slot 200, so as to prevent the Open CELL from being separated apart due to high temperature impact; a length or width of the outward extending portion 203 (i.e., a depth of the slot 200 at an uppermost position thereof) is in a range from 0.1 mm to 0.3 mm, and a thickness of the outward extending portion 203 (i.e., a distance from the upper edge of the slot 200 to the top end of the rubber frame 107') is in a range from 0.1 mm to 0.2 mm.

The width d of the slot 200 is the sum of a thickness of one layer of double-faced adhesive tape, a thickness of the liquid crystal cell (i.e., the CF and the TFT substrates) and a thickness of one polarizer (i.e., only the lower polarizer). The thickness of the double-faced adhesive tape is usually 0.2 mm, the thickness of the polarizer is usually in a range from 0.1 mm to 0.15 mm, and the thickness of the liquid crystal cell is usually in a range from 0.4 mm to 0.8 mm, thus, the width d of the slot 200 is usually in a range from 0.7 mm to 1.05 mm.

The top end of the rubber frame 107' is provided with a double-faced adhesive tape, and when the cover plate 101 is adhered through a FOB process, the cover plate 101 is adhered to the second double-faced adhesive tape 302 on the top end of the rubber frame 107'; the end of the liquid crystal cell is adhered within the slot 200 via the first double-faced adhesive tape 301, so as to form an enclosed configuration separated from external environment and effectively prevent moisture from entering the backlight and causing defects such as expansion or shrink of optical films, such as reflecting film, prism film or diffuser film, when the display device is being subjected to reliability tests, and prevent faults such as abnormal picture display caused by such defects.

Each embodiment of the present disclosure is described step by step, descriptions of similar parts in the embodiments are interchangeable, and differences of each embodiment from other embodiments are emphasized. Specially, as for the method embodiment, which is similar to the device embodiment, description thereof is relatively simplified and may refer to the description of relevant parts of the method embodiment.

Although specific embodiments of the present disclosure have been described, the scope of the disclosure is not limited thereto. All modifications and changes made readily by those skilled in the art without departing the spirit of this disclosure shall fall within the scope of the disclosure. The scope of the disclosure is defined by the appended claims and their equivalents.

What is claimed is:

1. A frame for a liquid crystal display device, wherein a side wall of the frame is provided with a slot configured to receive a liquid crystal cell inserted therein, and the slot is formed as a half-closed structure having three enclosing side walls and only one open side, and wherein one enclosing side wall of the slot which is not opposite to the open side extends outwards to form a stepped surface on which the liquid crystal cell is seated, and a bottom surface of the slot opposite to the open side is configured to be inclined with respect to the stepped surface such that a depth of the slot gradually becomes larger from the stepped surface to an upper side wall of the slot located adjacent to the open side and opposite the stepped surface, and the bottom surface of the slot is configured to be in contact with at least a portion of an edge, close to the stepped surface, of a side surface of the liquid crystal cell, the side surface of the liquid crystal cell facing the bottom surface of the slot.

2. The frame according to claim 1, wherein an angle formed between the bottom surface and a normal line of the stepped surface is greater than or equal to 3 degrees and less than or equal to 5 degrees.

3. The frame according to claim 1, wherein the upper side wall of the slot forms an outward extending portion at an upper end of the frame to restrict the liquid crystal cell inserted within the slot from above.

4. The frame according to claim 1, wherein a width of the slot is configured to match with a thickness of the liquid crystal cell.

5. The frame according to claim 1, wherein a depth of the slot at a deepest location thereof ranges from 0.1 mm to 0.3 mm.

6. The frame according to claim 1, wherein a distance between the upper side wall of the slot and a top end of the frame ranges from 0.1 mm to 0.2 mm.

7. A backlight, comprising the frame according to claim 1.

8. A display device, comprising the frame according to claim 1.

9. The display device according to claim 8, further comprising:
a first double-faced adhesive tape disposed between a side surface of the liquid crystal cell and the bottom surface of the slot for adhering the liquid crystal cell and the frame together.

10. The display device according to claim 8, further comprising:
a second double-faced adhesive tape disposed on a top end of the frame for adhering a cover plate and the frame together.

11. A method for assembling a display device, comprising:
adhering a cover plate and a liquid crystal cell together via clear optical adhesive; and
assembling the liquid crystal cell to which the cover plate is adhered and the backlight according to claim 7 together, wherein an end of the liquid crystal cell is disposed within the slot in the side wall of the frame.

12. The method according to claim 11, further comprising:
arranging a first double-faced adhesive tape within the slot in the side wall of the frame of the backlight, and arranging a second double-faced adhesive tape at a top end of the frame; and
assembling the liquid crystal cell to which the cover plate is adhered with the backlight,
wherein assembling the liquid crystal cell to which the cover plate is adhered and the backlight together comprises:
adhering the cover plate with the top end of the frame via the second double-faced adhesive tape; and
adhering an end of the liquid crystal cell is adhered within the slot via the first double-faced adhesive.

13. A display device, comprising the backlight according to claim 7.

14. The display device according to claim 13, further comprising:

a first double-faced adhesive tape disposed between a side surface of the liquid crystal cell and the bottom surface of the slot for adhering the liquid crystal cell and the frame together.

15. The display device according to claim 13, further comprising:
a second double-faced adhesive tape disposed on a top end of the frame for adhering a cover plate and the frame together.

* * * * *